United States Patent [19]
Karpenko

[11] 3,889,924
[45] June 17, 1975

[54] VALVE STEM OPERATOR

[75] Inventor: Anatole N. Karpenko, San Francisco, Calif.

[73] Assignee: Anchor/Darling Valve Company, Hayward, Calif.

[22] Filed: Dec. 3, 1973

[21] Appl. No.: 421,146

[52] U.S. Cl............... 251/249.5; 74/89.2; 185/40 R
[51] Int. Cl............................................. F16k 31/53
[58] Field of Search............. 251/248, 249.5, 250.5; 74/2, 89.15, 89.2; 192/.03, .07, .096, 91 R; 185/40 R, 40 A

[56] References Cited
UNITED STATES PATENTS

| | | | |
|---|---|---|---|
| 3,122,351 | 2/1964 | Brown | 74/2 X |
| 3,306,317 | 2/1967 | Brown | 251/73 X |
| 3,505,888 | 4/1970 | Denkowski | 74/89.15 |

*Primary Examiner*—Martin P. Schwadron
*Assistant Examiner*—David R. Matthews

[57] ABSTRACT

A valve stem operator which is power driven in one direction by a motor through a clutch and is driven in the opposite direction by a clock spring when the clutch is disengaged. The valve stem is a threaded rod which is moved by a jack nut carried on a rotary drive arbor. The drive arbor is connected to the inner end of the clock spring and is also disengageably connected through a clutch to an air motor driven worm gear. With the clutch engaged, the air motor and worm gear rotate the arbor to move the valve stem while also winding the clock spring. With the clutch disengaged, the clock spring rotates the drive arbor to move the valve stem in the opposite direction. A clutch shifter mechanism moves the clutch into engagement with the air cylinder and is biased out of engagement by a stripper spring such that if control air is removed from the cylinder the clutch will disengage and the clock spring will shift the valve stem automatically.

7 Claims, 7 Drawing Figures

VALVE STEM OPERATOR

BACKGROUND OF THE INVENTION

Automatically controlled valves have increasing use in modern fluid circuits. This is particularly true in processing where a remote valve may be operated from a central control station. Present valves, however, have been found insufficient for handling substances where a high degree of safety is necessary, such as the nuclear and dangerous chemical categories. In such fields, it is imperative that the valve function to selectively "isolate" or open the line in the event of a failure in the control circuit, that is, to fail safe.

SUMMARY OF THE INVENTION

It is a principal object of the present invention to provide a valve stem operator which may be controlled from a remote position to either open or close the valve and which will automatically function in a prescribed manner in the event of a failure in control command.

It is another object of the present invention to provide a valve stem operator in which a motor drives the valve stem to an open position and at the same time winds a drive spring such that upon failure of the control the prewound spring will drive the valve into the closed position.

Another object of the invention is to provide such a motor drive which includes a worm gear and clutch coupling from the motor to a rotary drive arbor on the valve stem such that the clutch can engage and disengage the motor driven worm gear with the drive arbor. The drive spring is directly connected to the drive arbor such that upon shifting of the clutch on engagement with the motor, the drive spring will rotate the drive arbor.

A still further object is to provide a valve stem operator in which a threaded valve stem is moved by a jack nut to open and close the valve. The jack nut is connected to a drive arbor which is selectively rotated by either the motor driven worm gear or a clock spring. A clutch, situated between the worm gear and drive arbor, is shifted by an air cylinder to engage the gear and arbor to allow the motor to open or close the valve. Upon failure of the motor control, either the air cylinder or a biasing stripper spring shifts the clutch out of engagement and the clock spring rotates the drive arbor and jack nut to remove the valve stem automatically in a prescribed direction.

Another object is to provide the above advantages in a system which may be readily situated on top of a valve bonnet and which works in a reliable and efficient manner.

DESCRIPTION OF THE PREFERRED EMBODIMENT

Figures 1, 2:
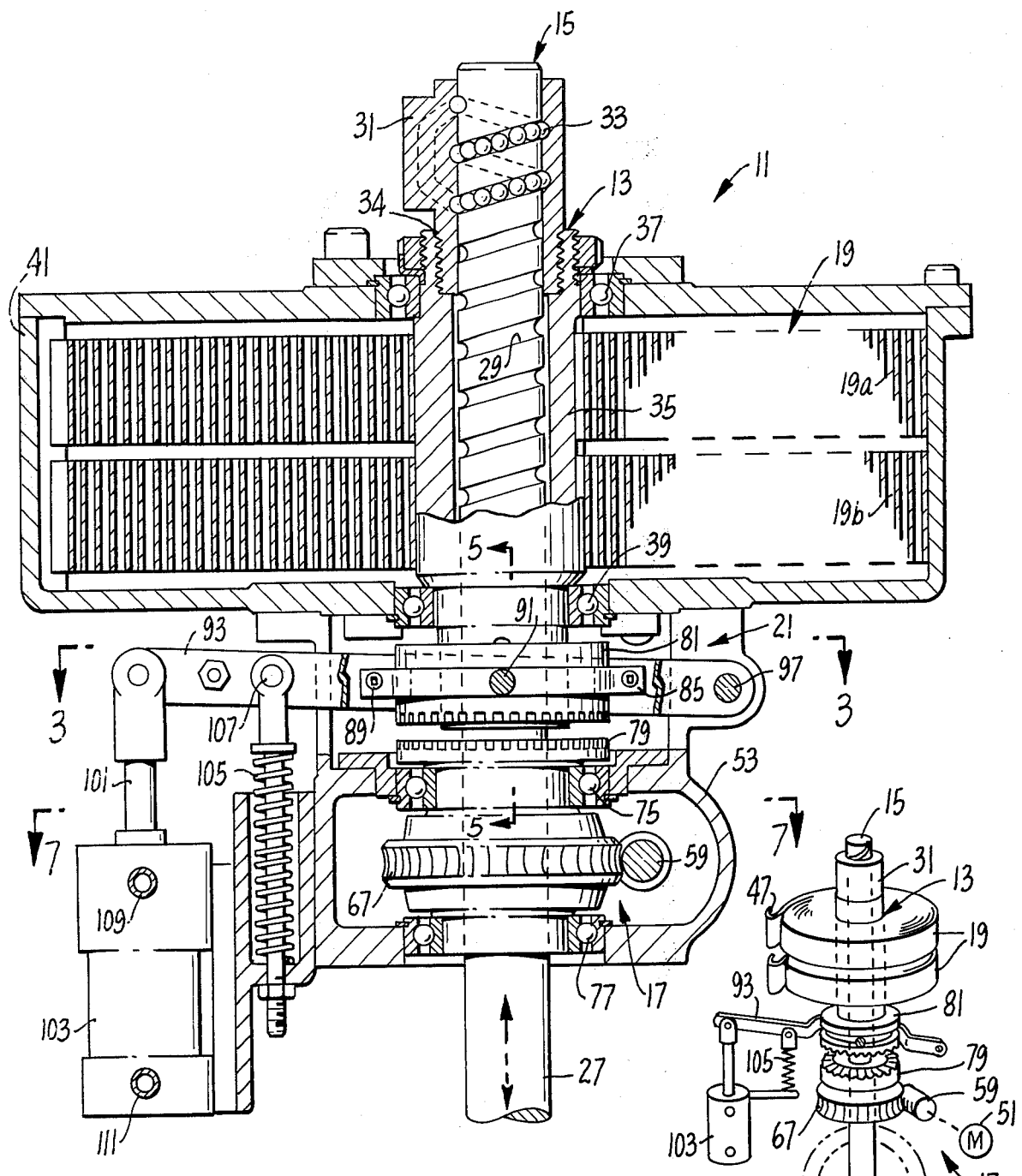
FIG. 1 is an elevational section of the preferred embodiment of the present invention.
FIG. 2 is a schematic representation of the device in FIG. 1 illustrating the same in use with a gate valve.

Looking to the drawings, there is shown a valve stem operator 11 having a rotary drive means 13 adapted to move a valve stem 15 between an open and closed position. A motor means 17 is disengageably coupled to the drive means and is formed to power the movement of the valve stem. Clock spring means 19 has one end attached to the drive means for exerting a rotary force thereon. A clutch means 21 disengageably couples the motor means to the rotary drive means whereby, when engaged, actuation of the motor will rotate the drive means to move the valve stem in one direction and also wind the clock spring 19. With the clutch disengaged, the prewound clock spring 19 will rotate drive means 13 to move valve stem 15 in the opposite direction.

Valve stem operator 11 may conveniently be attached to the top of the bonnet of a valve housing 23 to reciprocate valve stem 15 and raise and lower a gate valve disc 25 into and out of position on a valve seat as shown in FIG. 2.

Valve stem 15 takes the form of an elongated rod 27 having threads 29 along its upper end. A ball nut 31 carries balls 33 which engage the threads for low friction connection. Upon rotation the ball nut acts as a jack to raise and lower the valve stem. Nut 31 is secured through threaded connections 34 to a drive arbor 35 and forms therewith the rotary drive means 13. The drive arbor encircles the valve stem and is supported by spaced ball bearings 37 and 39 in a cup-shaped frame member 41.

A pair of clock springs 19a and 19b encircle drive arbor 35 and are secured thereto by bending their inner ends inwardly as at 43 to fit in slots 45 on the drive arbor. Clock springs 19a and 19b are housed in cup-shaped member 41 and have their outer ends 47 secured thereto by looping the ends around pins 49. The clock springs should be of sufficient size to rotate the rotary drive member and remove the valve stem. By providing a plurality of clock springs, it is ensured that the stem will be driven even if one fails.

Motor means 17 includes an air driven motor 51 supported on lower frame member 53 by bolts 55. Motor driven shaft 57 carries worm 59 and is supported in spaced bearings 61 and 63 on the lower frame member 53. The distal end of shaft 57 extends beyond frame 53 and is formed with a square shaped extension 65 which allows the shaft to be rotated manually with a wrench.

Worm 59 meshes with worm gear 67 carried on concentric tubular shafts 69a and 69b by keys 71 and pins 73. Shaft 69b is supported on spaced ball bearings 75 and 77 on the lower frame member 53 in coaxial relation with valve stem 15. Clutch hub 79 is fixed at the upper end of worm gear shaft 69b.

Figure 3:
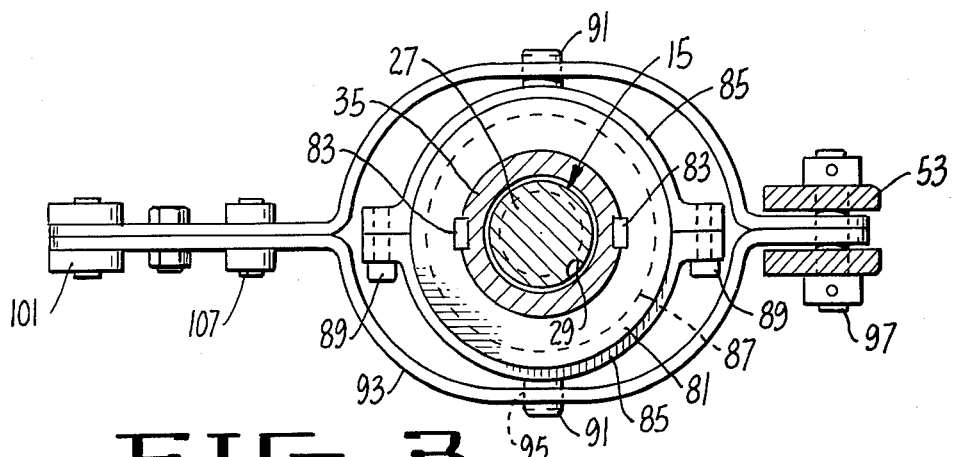
FIG. 3 is a sectional plan view taken substantially in the plane of line 3—3 of FIG. 1.
Figure 4:
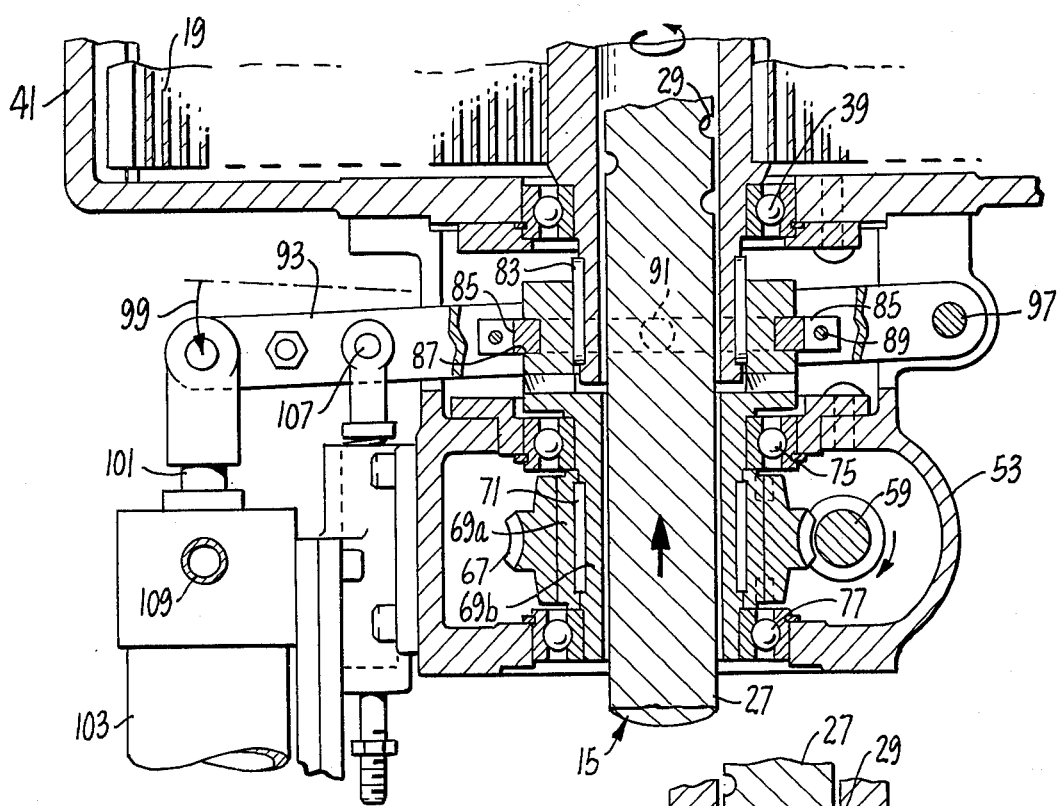
FIG. 4 is an enlarged sectional view of the device in FIG. 1 in another position.
Figure 5:
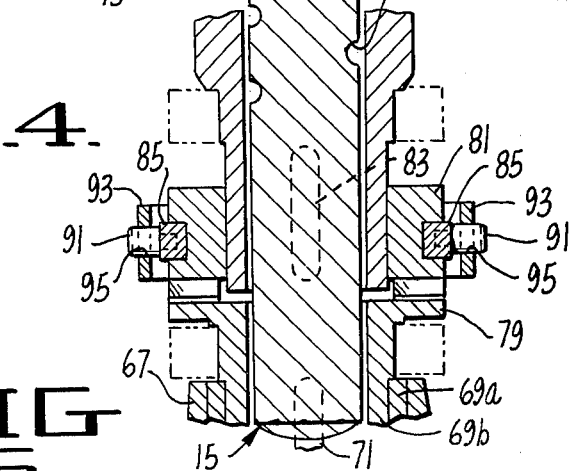
FIG. 5 is a sectional elevational view taken substantially in the plane of line 5—5 of FIG. 1.
Figure 6:
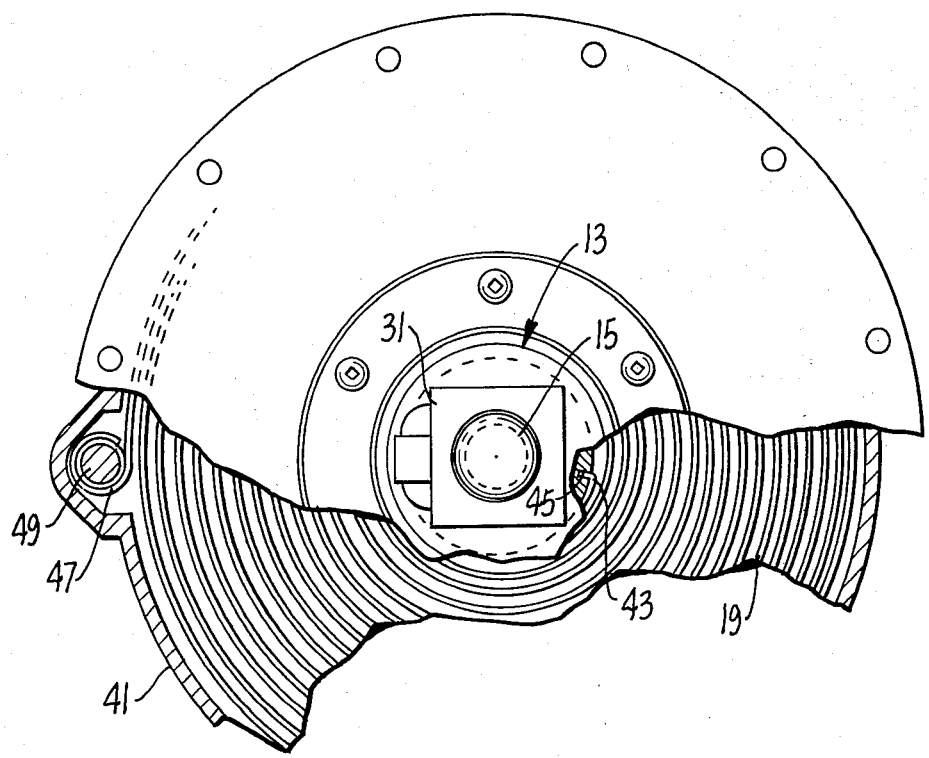
FIG. 6 is a fragmentary plan view with parts broken away of the device in FIG. 1.
Figure 7:
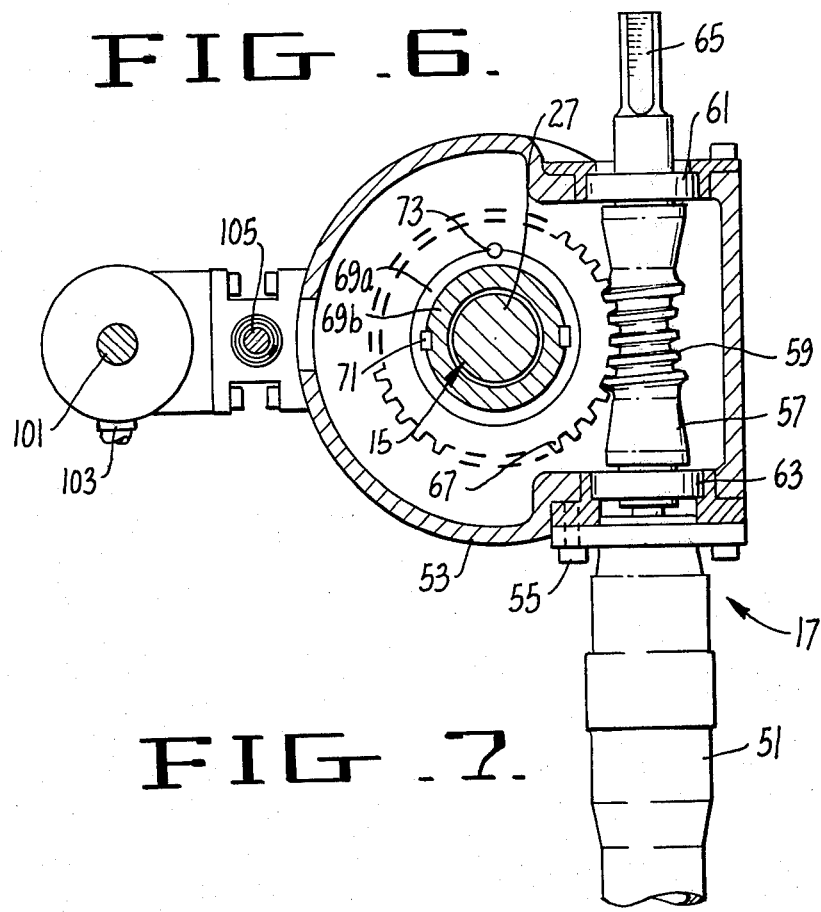
FIG. 7 is a sectional plan view taken substantially in the plane of line 7—7 of FIG. 1.

A movable clutch hub 81 is slidably keyed to the lower end of rotary drive arbor 35 by keys 83 for movement into and out of engagement with fixed clutch hub 79. Movable clutch 81 carries split shifter bands 85 in circular slot 87. Shifter bands 85 are attached together by screws 89 and carry pins 91 protruding outward from either side thereof. Pins 91 engage shifter bar 93 in holes 95 and move the clutch hub 81 into and out of engagement when the shifter bar is raised and lowered (see FIGS. 3, 4 and 5). Shifter bar 93 is in the form of a two piece yoke pivoted to frame 53 on shaft 97 at one end. Shifter bar 93 is pivoted through arc 99 by air cylinder rod 101 actuated by air cylinder 103. Stripper spring 105 is attached to bar 93 through pin 107, and biases the shifter bar upward as viewed in FIG. 1 to disengage the clutch.

In operation, control air is administered through line 109 to the upper end of cylinder 103 in response to a command from a remote control center. The piston in cylinder 103 pulls shifter bar 93 downward to pull movable clutch hub 81 into engagement with clutch hub 79 and compress stripper spring 105. Power air is supplied to air motor 51 to drive worm 59 against worm gear 67 and rotate clutch 79. Clutch 81 transmits rotary power to drive arbor 35 and nut 31 to valve stem shaft 15 and raises and lowers valve disc 25. As drive arbor 35 rotates to move the valve stem upward, it also winds clock spring 19 to store potential energy in the helical windings. Since the worm gear drive is essentially a one way power transmitter, the motor may be stopped and the valve stem will remain in its set position with the spring in a wound condition.

The clutch shifter bar 93 will move upward, either in response to a control command of air through port 111 in cylinder 103 or by the action of stripper spring 105 if there is a loss of air pressure in line 109. Upon upward movement of shifter bar 93, clutch hub 81 will disengage from fixed clutch hub 79 to disengage motor drive means 17 from rotary drive means 13. Prewound clock spring 19 will now exert a rotary force on drive means 13 to move the valve stem in the opposite direction. Thus, upon complete failure of control from the central command station, the valve will close in a fail safe manner.

In summation, the invention essentially comprises a fail safe valve operator, including a valve body having a valve seat therein and a valve member mounted in the valve body for movement toward and away from the valve seat to closed and open positions, respectively. A valve stem is connected with the valve member to move the valve member between its open and closed positions and motor means is operatively connected with the valve stem to operate it to one of said positions. Clutch means is connected between the motor means and valve stem to selectively engage and disengage the motor means from the valve stem and spring means is connected with the valve stem so that when said valve stem is operated to its said one position energy is stored in the spring means. When the clutch means is disengaged to disengage said motor means from the valve stem, the spring means acts on the valve stem to return the valve member to its other position.

From the foregoing, it will be seen that the present invention satisfies the demands for a remotely controlled fail safe valve operator and does so in a reliable and efficient manner.

I claim:

1. A fail safe valve operator, comprising: a valve body having a valve seat therein; a valve member mounted in the valve body for movement toward and away from the valve seat to closed and open positions, respectively; a valve stem connected with the valve member to move the valve member between its open and closed positions; motor means operatively connected with the valve stem to operate it to one of said positions; clutch means connected between the motor means and valve stem to selectively engage and disengage the motor means from the valve stem; and spring means connected with the valve stem so that when said valve stem is operated to its said one position energy is stored in the spring means, and when said clutch means is disengaged to disengage said motor means from the valve stem, the spring means acts on the valve stem to return the valve member to its other position.

2. A device as described in claim 1, wherein said motor means includes a rotary drive means connected to move the valve stem, said spring means comprising clock spring means having one end attached to the drive means for exerting a rotary force thereon, whereby said clock spring is wound when the motor means is connected through the clutch means to move the drive means to move the valve member to its said one position, and when the clutch means is disengaged, the prewound clock spring rotates the drive means to move the valve stem to its other position.

3. The valve stem operator as described in claim 2 wherein said motor means is coupled to said clutch through a worm gear drive such that the clock spring cannot rotate the drive means when the clutch is engaged, even when the motor is not actuated.

4. A device as described in claim 2 and wherein said clutch has a selective clutch shifter mechanism which is powered by a fluid cylinder to engage the clutch and which is biased to disengage the clutch when the cylinder is deactivated.

5. A device as described in claim 1 and wherein said clock spring means includes a plurality of clock spring elements.

6. A device as described in claim 1 wherein said rotary drive means is coupled to said valve stem through a low friction ball jack nut.

7. A device as described in claim 1 and wherein said rotary drive means, clock spring means and clutch means are coaxially aligned around said valve stem.

* * * * *